United States Patent [19]

Diehl et al.

[11] Patent Number: 5,568,179
[45] Date of Patent: Oct. 22, 1996

[54] METHOD AND APPARATUS FOR DEVICE CONTROL BY DATA TRANSMISSION IN TV LINES

[75] Inventors: Eric Diehl, Strasbourg; Joel Hamon, Lipsheim, both of France

[73] Assignee: Thomas Consumer Electronics, S.A., Courbevoie, France

[21] Appl. No.: 64,522

[22] Filed: May 19, 1993

[30] Foreign Application Priority Data

May 19, 1992 [EP] European Pat. Off. ............. 92401364

[51] Int. Cl.⁶ .................................................. H04N 7/16
[52] U.S. Cl. ................. 348/6; 348/10; 348/460; 348/461; 348/478; 455/6.1
[58] Field of Search .................... 348/460, 461, 348/465, 473, 478, 10, 7, 12, 13, 474; 455/3.1, 4.2, 5.1, 6.1, 6.2, 6.3; 380/23, 24, 16; H04N 7/087, 7/16, 7/173

[56] References Cited

U.S. PATENT DOCUMENTS

| | | | |
|---|---|---|---|
| 4,891,703 | 1/1990 | Noudan | 348/461 |
| 4,916,737 | 4/1990 | Chomet et al. | 380/20 |
| 5,070,404 | 12/1991 | Bullock et al. | 348/461 |
| 5,105,268 | 4/1992 | Yamanouchi et al. | 348/10 |
| 5,144,663 | 9/1992 | Kudelski et al. | 380/16 |
| 5,231,664 | 7/1993 | Bestler et al. | 348/473 |
| 5,260,788 | 11/1993 | Takano et al. | 348/478 |
| 5,272,753 | 12/1993 | Nakayama et al. | 380/23 |
| 5,282,249 | 1/1994 | Cohen et al. | 380/23 |
| 5,287,181 | 2/1994 | Holman | 348/473 |
| 5,325,431 | 6/1994 | Naruse | 380/16 |
| 5,345,594 | 9/1994 | Tsuda | 348/6 |
| 5,351,294 | 9/1994 | Matsumoto et al. | 380/23 |
| 5,414,773 | 5/1995 | Handelman | 380/49 |
| 5,434,397 | 7/1995 | Diehl et al. | 235/380 |
| 5,461,675 | 10/1995 | Diehl et al. | 380/23 |

FOREIGN PATENT DOCUMENTS

| | | |
|---|---|---|
| 2059552 | 2/1991 | Canada . |
| 0098226 | 1/1984 | European Pat. Off. . |
| 0243312 | 10/1987 | European Pat. Off. . |
| WO88/01463 | 2/1988 | WIPO . |
| WO91/03127 | 3/1991 | WIPO . |

*Primary Examiner*—John K. Peng
*Assistant Examiner*—Chris Grant
*Attorney, Agent, or Firm*—Joseph S. Tripoli; Peter M. Emanuel; Robert D. Shedd

[57] ABSTRACT

A video signal processing system, such as a pay TV system, that includes a smart card access control feature decodes control information from data included in groups of video line intervals that represent data channels. Each channel includes data arranged in packets of data. Each packet includes both descriptor data and application data. The packets of data are extracted from the video lines by a data dispatcher. After receiving a packet from a data channel, the data dispatcher analyses the descriptor data to determine the target for the application data. The data dispatcher transmits the application data contained in the packet, without analyzing the data, to the correct target processor unit, e.g. either a control access processor or a decoder intelligent processor. Information that may be transferred to the decoder processor includes, a specific channel allocation table, data related to the VTR of the customer, and information related to a geographic location.

11 Claims, 2 Drawing Sheets

METHOD AND APPARATUS FOR DEVICE CONTROL BY DATA TRANSMISSION IN TV LINES

FIELD OF THE INVENTION

The present invention relates to a method and to an apparatus for device control by data transmission in TV lines.

BACKGROUND

Video signal processing systems for receiving and decoding "pay TV" signals may include a control access system involving a "smart card" feature. A smart card provides data processing capability, e.g. a microprocessor and memory, embedded in a small card similar to a credit card. Information is stored in the card such as pay-TV access information pertaining to the card's owner. The card is inserted into a decoder to enable decoding of the "pay TV" signals.

When the smart card is removed from a system, the pay TV decoder loses its "identity". The smart card provides information that gives the decoder an address to which information may be directed. However, the address belongs to the smart card and not to the decoder. These systems offer detachable control access capability, but lose information that may be directly applicable to a particular decoder such as geographical information. For example, it may be desirable for information, such as that listed below, to be down loaded via the transmission channel:
specific channel allocation table;
data related to the VTR of the customer;
messages related to a geographic location.

SUMMARY OF THE INVENTION

The present invention resides, in part, in recognition of the described problem and, in part, in providing a method and apparatus for solving the problem. More specifically, it is an object of the invention to provide a method of addressing a given decoder in a defined geographic location.

In accordance with an aspect of the invention, a video signal processing system, such as a pay-TV decoder, is controlled by data transmitted in horizontal line intervals of the TV signal, wherein two or more groups of one or more lines each contain packets of digital data. Each packet contains descriptor data and application data. The descriptor data is decoded in a data dispatcher to direct the associated application data to a particular device in which the respective application data is evaluated.

In accordance with another aspect of the invention, a video signal receiver embodying the invention includes a data extractor which extracts a bit stream from video lines and forms digital data packets which are passed to a data dispatcher. The data dispatcher decodes descriptor data in the data packets and, according to the content of the descriptor data, directs the respective application data from the packet to either a processor in a pay TV decoder or to a smart card interface processor. The smart card interface processor may then communicate the information to a smart card via a smart card reader.

BRIEF DESCRIPTION OF THE DRAWING

The invention may be better understood by referring to the accompanying drawing, in which.

DETAILED DESCRIPTION

Figure 1:
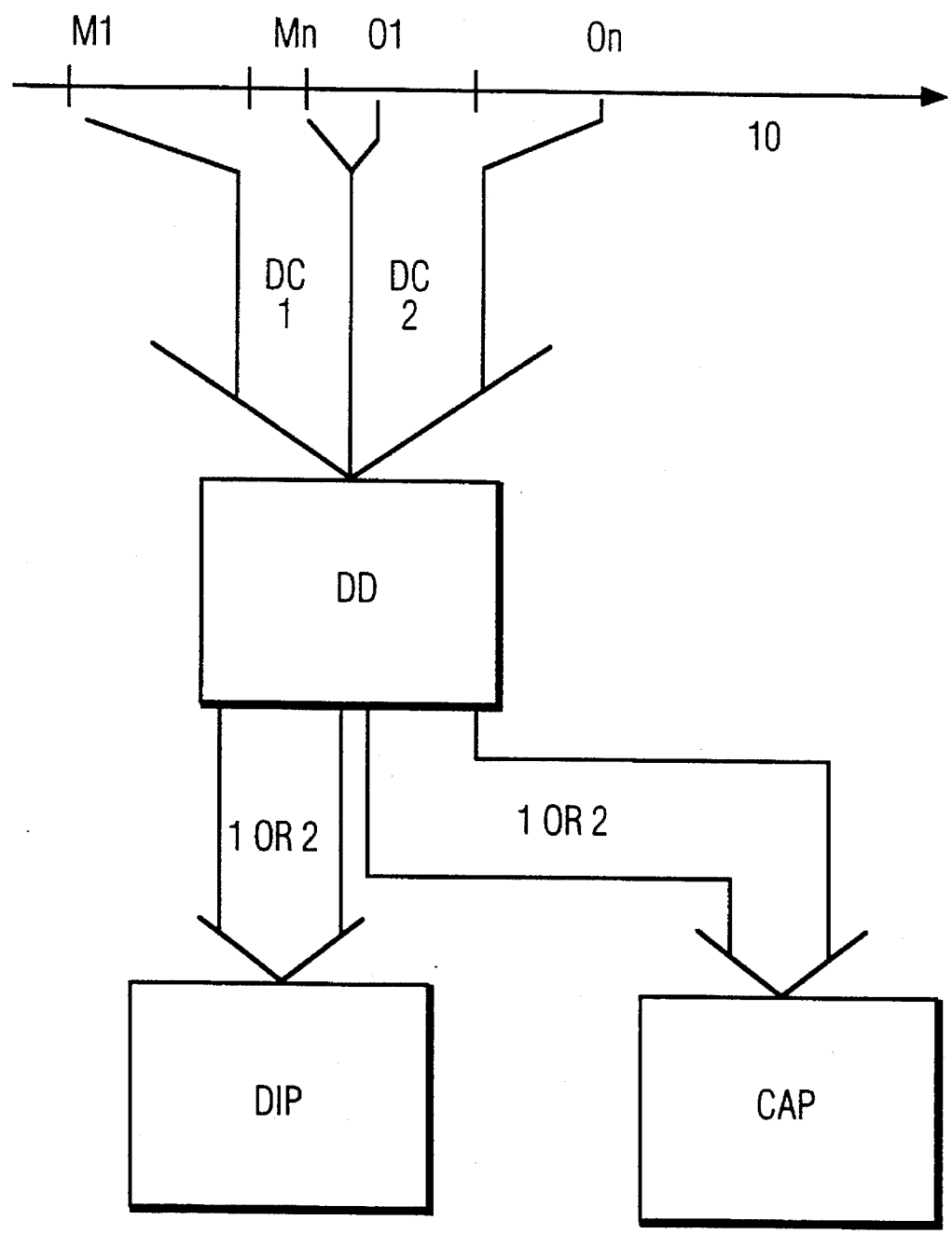
FIG. 1 shows, in block diagram form, a video signal processing system including an embodiment of the invention.

In FIG. 1, two data channels included in a video signal are depicted. Video lines M1 . . . Mn form a first data channel DC1 and video lines O1 . . . On form a second data channel DC2. The two channels are time multiplexed in the video signal as shown on time axis 10 in FIG. 1.

The data format on both data channels is identical. Data carried by the data channels is organized in packets of data. The beginning and end of a packet may be indicated by, for example, a particular data pattern included in the information. Each packet contains two types of information: descriptor data and application data. The descriptor data may be included in a header portion of the packet. The purpose of each type of information is described further below.

A video signal receiver embodying the invention includes a data dispatcher unit designated DD in FIG. 1. The data dispatcher generates a binary bit stream representing the information in the data channels. The data dispatcher may include a data slicer for converting the video signal into binary values. The data dispatcher may also perform error detection and correction processing independently for each of the two data channels.

After receiving a packet from a data channel, the data dispatcher analyses the descriptor data in the packet header. The descriptor data contains information describing the target device (i.e. destination for the packet data). According to this information, the data dispatcher transmits the application data from the packet, without analyzing the data, to one of two processor units: either control access processor CAP or decoder intelligent processor DIP shown in FIG. 1. Control access processor CAP communicates with a smart card to control access to pay-TV services. Decoder intelligent processor DIP provides general control capability for the decoder functions.

Figure 2:
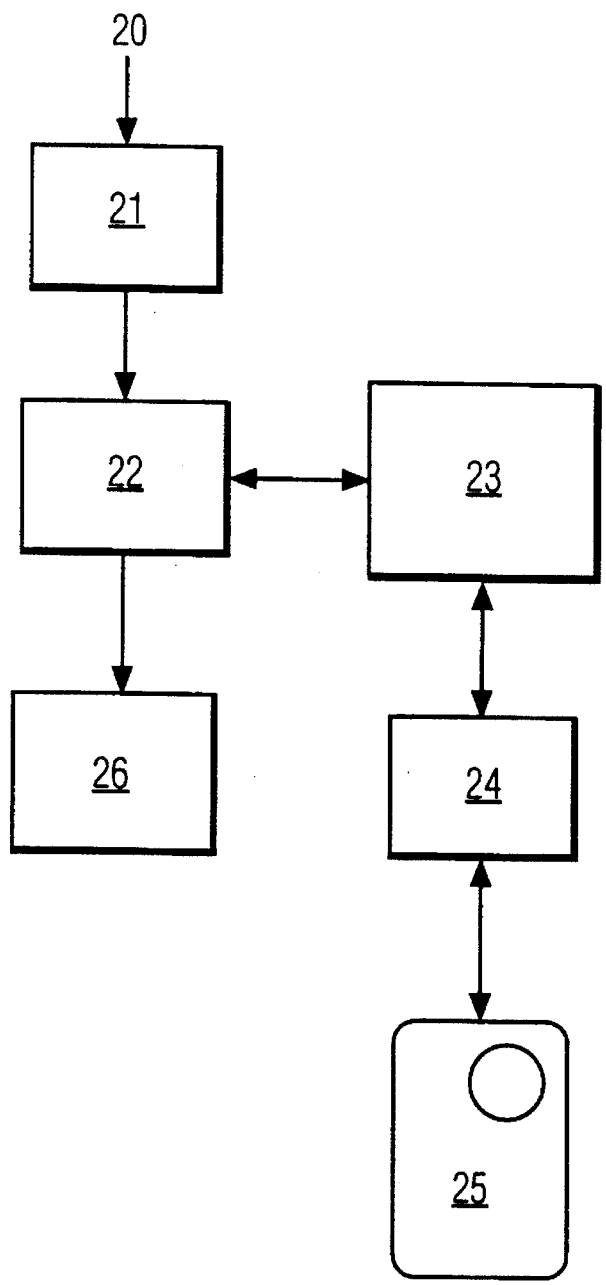
FIG. 2 shows, in block diagram form, a more detailed representation of the system shown in FIG. 1.

The described features may be better understood by referring to FIG. 2 which shows an embodiment of the invention in a VIDEOCRYPT pay TV system. In FIG. 2, a bit stream is extracted from the video lines in video signal 20 by data extractor 21 which forms the binary bit stream for the data channels. The respective data is passed to a data dispatcher 22 which extracts the packet data from the two data channels.

The value of a parameter in the descriptor data for a packet, e.g a parameter designated header, determines whether the data dispatcher will send the application data to DIP 26 in a pay TV decoder or to VIDEOCRYPT verifier 23. Verifier 23 communicates conditional access data through a smart card reader 24 to a smart card 25 which provides the kernel of the access control system. If a customer is entitled to access a pay-TV service, smart card 25 returns information to data dispatcher 22 via VIDEOCRYPT verifier 23 that enables the video signal descrambling.

Various modifications of the described embodiments are possible. For example, the data dispatcher DD, the DIP, and the CAP can be made from different processors or from one single processor which executes respective different processes. The system may be extended to more than two data channels. As an example, additional video lines may be used to transmit data or the allocation of video lines to data channels can be modified to create additional channels.

The described embodiment provides two independent data channels where one can be dedicated to the control access system based on the smart card and the other dedicated to the decoder. The allocation of one data channel to one function can be changed at any time because the data dispatcher analyses the descriptor information in each packet in real time. The two data channels can both be dedicated to the DIP or to the CAP. This may occur when the function of one particular data channel changes (e.g. from being dedicated to the DIP to being dedicated to the CAP).

The operation of the data dispatcher may be modified such that information in the data channels pertains to more than the described two target processor units, i.e. the DIP and CAP. Also, the number of data channels can be different from the number of target processor units. It is preferable, however, that only one data dispatcher is required. The data dispatcher may also manage the video descrambling.

The invention is applicable to pay TV systems in PAL, SECAM and NTSC systems.

These and other modifications are intended to be within the scope of the following claims.

We claim:

1. A method of controlling a video signal processing system by transmission of data other than video and audio data in horizontal line intervals in a video signal, wherein said data other than video and audio data that is transmitted in said line intervals comprises first data associated with a first data channel and second data associated with a second data channel, said first data and said second data being arranged in packets of data and each of said packets including descriptor data and respective application data, comprising the steps of:

extracting said descriptor data and said respective application data from each of said packets;

analyzing said extracted descriptor data to determine which one of a first target device and a second target device will evaluate said respective application data;

dispatching said respective application data extracted from each of said packets to only said one of said first and second target devices determined by said analyzed descriptor data; and evaluating said application data only in said one of said first and second target devices;

said video lines being included in a vertical blanking interval in said video signal;

said first and second target devices being included in a pay-TV decoder; said first target device comprising a decoder processor; and said second target device comprising a smart card processor included in a smart card for evaluating a portion of said data dispatched to said second target device.

2. A method of controlling a video signal processing system by transmission of data other than video and audio data in horizontal line intervals in a video signal, wherein said data other than video and audio data that is transmitted in said line intervals comprises first data associated with a first data channel and second data associated with a second data channel, said first data and said second data being arranged in packets of data and each of said packets including descriptor data and respective application data, comprising the steps of:

extracting said descriptor data and said respective application data from each of said packets;

analyzing said extracted descriptor data to determine which one of a first target device and a second target device will evaluate said respective application data;

dispatching said respective application data extracted from each of said packets to only said one of said first and second target devices determined by said analyzed descriptor data; and evaluating said application data only in said one of said first and second target devices;

said video lines being included in a vertical blanking interval in said video signal; said first and second target devices being included in a pay-TV decoder; said first target device comprising a decoder processor and said second target device comprising a smart card processor included in a smart card for evaluating a portion of said data dispatched to said second target device; said data in each of said data channels having the same format and said data including error correction information.

3. Method according to claim 2, wherein the step of dispatching said application data to said one of said first and second target devices is executed in a data dispatcher in real time.

4. In a system for processing a video signal including data other than video and audio data, said data occurring during a horizontal line interval within a vertical blanking interval, said data other than video and audio data being organized in packets of data, each of said packets including descriptor data and application data, apparatus comprising:

a data extractor for extracting said descriptor data and said application data;

first and second means for evaluating said application data; and a data dispatcher for decoding said descriptor data to select a particular one of said first and second evaluating means to evaluate said application data, and for directing said application data to only said particular evaluating means;

said first evaluating means comprising a pay TV decoder processor and said second evaluating means comprising a control access processor included in a smart card for processing at least a portion of said application data directed to said second evaluating means.

5. The apparatus of claim 4 wherein each of said data packets is associated with one of a first data channel or a second data channel;

said data packets associated with said first data channel include application data for evaluation by only a particular one of said first and second evaluation means; and said data packets associated with said second data channel include application data for evaluation by only a particular one of said first and second evaluation means.

6. The apparatus of claim 5 wherein said data dispatcher includes means for detecting erroneous data in said data packets and for processing said erroneous data independently for each of said first and second data channels.

7. The apparatus of claim 6 wherein said means for processing erroneous data performs error correction independently for each of said first and second data channels.

8. In a system for processing a video signal including data other than video and audio data during a horizontal line interval within a vertical blanking interval, said data other than video and audio data being organized in packets of data, each of said packets including descriptor data and application data, apparatus comprising:

a data extractor for extracting said descriptor data and said application data;

first and second means for evaluating said application data; and a data dispatcher for decoding said descriptor data to select a particular one of said first and second evaluating means to evaluate said application data, and for directing said application data to only said particular evaluating means;

said first evaluating means comprising a pay TV decoder processor and said second evaluating means comprising a control access processor;

said control access processor including a smart card interface processor for communicating said application data to a smart card via a smart card reader;

said smart card including a processor for processing said application data communicated to said smart card.

9. The apparatus of claim 8 wherein each of said data packets is associated with one of a first data channel or a second data channel;

said data packets associated with said first data channel include application data for evaluation by only a particular one of said first and second evaluation means; and said data packets associated with said second data channel include application data for evaluation by only a particular one of said first and second evaluation means.

10. The apparatus of claim 9 wherein said data dispatcher includes means for detecting erroneous data in said data packets and for processing said erroneous data independently for each of said first and second data channels.

11. The apparatus of claim 10 wherein said means for processing erroneous data performs error correction independently for each of said first and second data channels.

* * * * *